J. E. BLACKMORE.
VALVE AND RETAINER THEREFOR.
APPLICATION FILED JULY 25, 1919.

1,357,608.

Patented Nov. 2, 1920.

WITNESS:
William Seston

INVENTOR
John E. Blackmore

BY
Charles E. Wisner
ATTORNEY

UNITED STATES PATENT OFFICE.

JOHN E. BLACKMORE, OF DETROIT, MICHIGAN.

VALVE AND RETAINER THEREFOR.

1,357,608.	Specification of Letters Patent.	Patented Nov. 2, 1920.

Application filed July 25, 1919. Serial No. 313,399.

*To all whom it may concern:*

Be it known that I, JOHN E. BLACKMORE, a citizen of the United States, residing at Detroit, county of Wayne, State of Michigan, have invented a certain new and useful Improvement in Valves and Retainers Therefor, and declare the following to be a full, clear, and exact description of the same, such as will enable others skilled in the art to which it pertains to make and use the same, reference being had to the accompanying drawings, which form a part of this specification.

This invention relates to valves and retainers therefor, and its object is to provide a taper seated valve having a projecting stem and a spring retainer adapted to be pressed over the end of the stem and bent in a manner to secure the same in position providing a seat for the spring, the whole providing a valve and retainer having no projecting parts or sharp edges as with the heretofore used cotter pin and washer arrangement which may catch the clothing, or cut the hands of the user in cleaning.

A further object of the invention is to provide a sheet metal spring retainer for valves and the like cupped to provide a seat for the spring and adapted to be quickly assembled on the valve stem, the stem having a groove providing a head and the retainer having a central aperture and inwardly projecting prongs adapted to be bent to place back of the head on the stem, securing the same on the stem. An additional object of the invention is to provide a spring retainer extremely simple in form and inexpensive to manufacture, that is readily assembled with the valve stem retaining the spring in position and holding it from lateral displacement. These objects and the several novel features of the invention in its preferred form are hereinafter more fully described and claimed and shown in the accompanying drawing in which—

Figure 1:
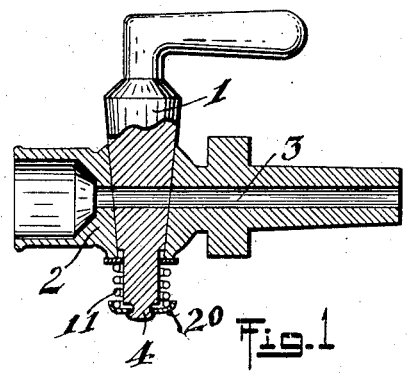
Figure 1 is a longitudinal section of a valve and retainer embodying my invention.

The valve 1 is usual taper form seating in a body 2 which may be of any desired form. The body is here shown as the usual type of priming cup for gasolene motors, but it is to be understood that the design of body for any particular purpose is not a part of this invention. The valve is provided with the usual transverse aperture which may be turned to register with a channel 3 of the valve body or turned at a right angle thereto. The valve is provided at the lower end with a headed stem 4 preferably formed integrally therewith and formed by cutting a circumferential groove 5 near the end of the stem and the diameter of the head formed at the lower end of stem is less than the diameter of the end of the valve body at the bottom of the groove thus providing a projecting circumferential shoulder 6. The groove 5 is rounded at the bottom as shown more particularly in Figs. 4 and 5 providing a portion between the head and the end of the valve body somewhat of the form of a truncated cone, the purpose of which is hereinafter described.

Figure 4:
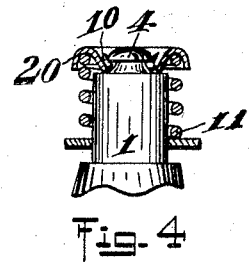
Fig. 4 is a detail showing the valve stem and mode of positioning the washer thereon with the inwardly projecting prongs engaging a shoulder of the stem.
Figure 5:
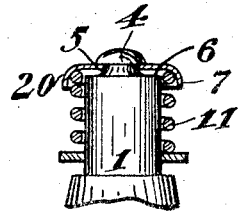
Fig. 5 is a similar detail showing the position of the parts when the retainer has been forced onto the stem bending the prongs to original position and seating against the head with which the stem is provided.
Figure 3:
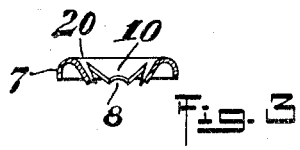
Fig. 3 is a cross section of the retainer showing the prongs formed by the slits bent inwardly on the cupped side of the washer to provide an aperture of greater diameter than the aperture between the prongs when in normal position.

The washer or retainer 20 is formed of stamped sheet metal cupped on one side providing a peripheral flange 7 and formed with a central aperture 8 of a diameter less than the diameter of the head 4 being slightly greater than that of the coned part at the point of junction with the head. In formation of the retainer 20, the body is provided with several radial slits 9 extending from the central aperture 8 toward the periphery of the washer and providing prongs 10 which are bent inwardly on the cupped side of the washer as shown particularly in Fig. 3 and thus providing an aperture greater than the diameter of the head and permitting the washer, when the prongs are thus bent inwardly, to be passed over the headed end with the prongs engaging the shoulder 6 at the end of the valve body as shown in Fig. 4. Previous to placing the retainer, a coiled spring 11 is positioned about the projecting end of the valve, the upper end of which seats against the valve body as shown in Fig. 1 and the lower end of which is seated in the cupped side of the retainer as will be understood from Fig. 4 with the inwardly projecting prongs engaging against the shoulder formed at the end of the valve 1. With the parts in such preliminary assembled relation as shown in Fig. 4, pressure on the retainer 6 by an instrument or device provided for the purpose forces the prongs to substantially original position in the plane of the body, the inner ends of the prongs riding from the bottom of the groove on the tapering surface and altering in position from that shown in Fig. 4 to substantially original position as shown in Fig. 5. The spring holds the retainer against the head 4 and, by reason of the springs seating against the body, as shown in Fig. 1, the valve is held securely on its seat.

The retainer should be of sufficient thickness and strength to prevent bending of the prongs by pressure of the spring alone. Thus, when the parts are in the final assembled relation, there is no tendency of the prongs to be bent inwardly by the spring pressure and accidentally force the retainer off from the head.

By cupping the washer as shown, the end of the spring is covered and, by forming the head 4 rounded at the end as shown, a retainer is provided that is practically smooth and uniform in shape and neat in appearance, and all liability of catching the clothing or cutting the hands of the user in handing the valve or in cleaning the same is avoided. Furthermore, a retainer is provided that is inexpensive in form and one that is more quickly assembled than the usual cotter pin and washer arrangement commonly used with valves of this character and, by the design and construction shown, a valve retainer device more serviceable in use and much neater in appearance is secured.

Figure 2:
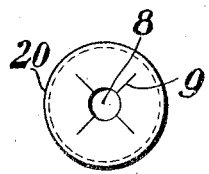
Fig. 2 is a plan view of the retainer showing the central aperture and slits extending therefrom toward the periphery, providing prongs.
Figure 6:
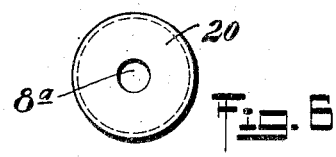
Fig. 6 is a plan view of an alternative form of washer.
Figure 7:
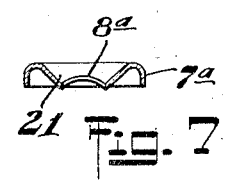
Fig. 7 is a cross section thereof when punched to enlarge the central aperture.

An alternative form of the invention is shown in Figs. 6 and 7 in which the body of the washer is not slitted as shown in Fig. 2. In this latter construction the washer 20 is made with a central aperture 8ª of practically the diameter of the neck 5 of the stem adjacent the head 4 and the metal is then punched inwardly as indicated at 21 in Fig. 7 toward the flanged side 7ª stretching the metal and enlarging the aperture 8ª sufficiently to enable it to be passed over the head 4 of the valve stem in the same manner as is indicated in Fig. 4. When in this position, the washer 20 may be pressed downward in the same manner as the washer shown in Figs. 2 and 3 forcing it to the position shown in Fig. 5 in which position it will be understood that the depressed portion 21 is returned substantially to original position and seating against the head of the stem.

Having thus fully described my invention, what I claim is—

1. In combination a tapered valve, a body therefor having a correspondingly tapered seat, a headed stem at the smaller end of the valve, a spring for holding the valve on its seat, and a retainer comprising a cupped washer having a central aperture, the body thereof having radial slits providing prongs bent out of the plane of the body to form an aperture greater in diameter than the head permitting the same to be inserted thereover, the small end of the valve being greater in diameter than the head providing a shoulder engaged by the prongs when passed over the head, pressure applied to the washer or retainer rebending the prongs to substantially the plane of the body with the neck of the said stem passing through a central aperture.

2. A retainer for valves and the like comprising in combination with a stem having a headed end, the stem end being greater in diameter than the head, of a retainer comprising a washer having a central aperture of approximately the diameter of the neck connecting the stem and head, the washer being provided with radial slits extending from the central aperture providing prongs inwardly bent to provide an aperture greater in diameter than the head permitting the washer to be passed thereover, the prongs being then rebent to substantially the plane of the body of the washer, and a spring engaging about the stem and placed under compression by the washer.

3. A spring retainer for valve stems and the like, the stem being provided with a terminal head less in diameter than the diameter of the end of the stem with which it is connected, consisting of a shallow cupped washer having a central aperture and radial slits extending therefrom toward the periphery providing prongs, the prongs being bent toward the cupped side of the washer providing an aperture greater in diameter than the diameter of the head permitting the washer to be placed thereover with the prongs engaging the stem end whereby application of pressure rebends the prongs to substantially the original position, and a spring placed under compression by the retainer and seating therein.

4. A retainer for coiled compression springs consisting of a washer formed of stamped sheet metal cupped to provide a seat for the spring and having a central aperture and a series of slits from the aperture toward the periphery providing prongs, the prongs being bent toward the cupped side enlarging the aperture to permit the washer to be placed over a head, the prongs being then rebent to substantially the plane of the washer to prevent removal.

5. A retainer for tapered valves and springs therefor comprising a stamped sheet metal washer formed with a peripheral flange on one side and a substantially central aperture and a series of slits extending from the aperture toward the periphery providing prongs, the valve having a headed end connected with the valve by a neck of less diameter than the head, the prongs being inwardly bent to provide an aperture to permit insertion of the head therethrough against which the prongs may seat when rebent to normal position substantially in the plane of the body.

6. The combination of a valve stem provided with a terminal head connected with the end of the valve by a neck of less diameter and gradually decreasing in diameter from the stem to the head, of a washer having a peripheral flange on one side and a central aperture substantially of the diameter of the smaller end of the neck, the body of the washer having radial slits extending from the said central aperture toward the periphery providing prongs, the prongs being bent toward the flanged side providing an aperture to permit the head to pass therethrough with the prongs engaging the end of the valve stem whereby pressure applied to the washer rebends the prongs to substantially original position engaging about the neck and seating on the head, and a spring seating in the flanged side of the washer.

7. A stamped sheet metal washer for valve stems and coiled compression springs therefor, the washer being formed with an upturned peripheral flange and a central aperture, radial slits extending from the aperture toward the periphery providing prongs normally bent toward the flanged side to enlarge the said aperture substantially as and for the purpose described.

8. The combination of a valve stem provided with a terminal head connected with the end of the stem by a neck of less diameter, of a washer having a peripheral flange on one side and a central aperture substantially of the diameter of the neck adjacent the head, the body of the washer being depressed centrally toward the flanged side stretching the metal to provide an aperture of a size to permit the head to pass therethrough with the wall of the aperture engaging the end of the rod about the neck whereby pressure applied to the washer rebends the said centrally depressed portion to substantially original position engaging about the neck and seating against the head, and a spring seating in the flanged side of the washer.

9. A stamped sheet metal washer for valve stems and coiled compression springs, the washer being formed with an upturned peripheral flange and a central aperture, the body of the washer previous to assembling being depressed toward the flanged side increasing the size of the aperture substantially as and for the purpose described.

10. A stamped sheet metal washer of the character described formed of a relatively soft material, having a central portion depressed out of the plane of the washer adapted upon assembly with a valve stem or the like to be pressed backward substantially into the plane of the body to decrease the size of the aperture.

In testimony whereof, I sign this specification.

JOHN E. BLACKMORE.